United States Patent [19]

Luszcz et al.

[11] Patent Number: 4,837,232

[45] Date of Patent: Jun. 6, 1989

[54] DENSE SKIN CERAMIC STRUCTURE AND METHOD OF MAKING THE SAME

[75] Inventors: Stanley J. Luszcz, Hockessin, Del.; Harry R. Zwicker, Elkton, Md.

[73] Assignee: Lanxide Technology Company, LP, Newark, Del.

[21] Appl. No.: 908,117

[22] Filed: Sep. 16, 1986

[51] Int. Cl.$^4$ .............................................. C04B 35/10
[52] U.S. Cl. ........................................ 501/127; 501/128; 501/134; 75/235; 264/65; 264/60; 423/625; 423/412
[58] Field of Search ............... 501/87, 88, 94, 96, 501/98, 92, 119, 127, 128, 134; 423/345, 412, 618, 625, 411; 264/65, 60; 75/235

[56] References Cited

U.S. PATENT DOCUMENTS

| | | | |
|---|---|---|---|
| 2,741,822 | 4/1956 | Udy | 264/65 |
| 3,255,027 | 6/1966 | Talsma | 264/65 |
| 3,262,763 | 7/1966 | Bechtold | 428/539.5 |
| 3,296,002 | 1/1967 | Hare | 501/80 |
| 3,298,842 | 1/1967 | Seufert | 501/127 |
| 3,419,404 | 6/1964 | Mao | 501/98 |
| 3,421,863 | 1/1969 | Bawa | 501/128 |
| 3,3437,468 | 4/1969 | Seufert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,789,096 | 1/1974 | Church et al. | 51/307 |
| 3,864,154 | 2/1975 | Gazza | 428/539.5 |
| 3,973,977 | 8/1976 | Wilson | 501/120 |

OTHER PUBLICATIONS

"Oxidation of Molten Aluminum Alloys. Reaction with Refractories", by M. Drouzy and M. Richard—Mar. 1974—Fonderie, France, No. 332, pp. 121-128.
"Refractories for Aluminum Alloy Melting Furnaces", by Clavaud and V. Jost, Sep. 1980—Trans. Lillian Brassinga, Jan. 1985.

Primary Examiner—William R. Dixon, Jr.
Assistant Examiner—Ann M. Bosco
Attorney, Agent, or Firm—Mark G. Mortenson; William E. McShane

[57] ABSTRACT

The invention concerns self-supporting ceramic structures, including ceramic composite structures embedding a filler, and methods of making them. The ceramic structures comprise a polycrystalline material made by oxidation of a body of molten parent metal with an oxidant. The polycrystalline material has a first region substrate surmounted by a terminal region stratum which is integral with the first region. The terminal region stratum is harder and of denser, finer crystalline structure than the first region substrate and is formed in a reaction stage subsequent to the reaction stage in which the first region of polycrystalline material is formed. Growth of the first stage is attained by attenuating or interrupting the transport of molten parent metal to the first region under conditions which nonetheless leave or maintain therein enough oxidizable molten parent metal to form the polycrystalline material of the terminal region.

21 Claims, 7 Drawing Sheets

|  1 cm  |

|  1 cm  |

DENSE SKIN CERAMIC STRUCTURE AND METHOD OF MAKING THE SAME

FIELD OF THE INVENTION

The present invention broadly relates to novel self-supporting ceramic bodies and to methods for producing the same by oxidation of a molten parent metal to form a plycrystalline material having integral first and terminal regions, the latter region exhibiting a finer crystallite structure than the former.

DESCRIPTION OF COMMONLY OWNED PATENT APPLICATIONS AND PRIOR ART

The subject matter of this application is related to copending and Commonly Owned U.S. patent applications Ser. No. 818,943, now U.S. Pat. No. 713,360, filed Jan. 15, 1986 which is a continuation-in-part of Serial No. 776,964, now abandoned, filed Sept. 17, 1985, which is a continuation-in-part of Ser. No. 705,787, now abandoned, filed Feb. 26, 1985, which is a continuation-in-part of U.S. application Ser. No. 591,392, now abandoned, filed Mar. 16, 1984, all in the name of Marc S. Newkirk et al. and entitled "Novel Ceramic Materials and Methods for Making the Same." These applications disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation product toward the oxidant thereby continuously developing a crystalline ceramic strucutre which can be produced having an interconnected, metallic component and/or interconnected porosity. The process may be enhanced by the use of an alloyed dopant, such as in the case of an aluminum parent metal oxidized in air. This method was improved by the use of external dopants applied to the surface of the precursor metal as disclosed in commonly owned and copending U.S. patent application Ser. No. 822,999, now allowed, filed Jan. 27, 1986, which is a continuation-in-part of Ser. No. 776,965, now abandoned, filed Sept. 17, 1985, which is a continuation-in-part of Ser. No. 747,788, now abandoned, filed June 25, 1985, which is a continuation-in-part of Ser. No. 632,636, now abandoned, filed July 20, 1984, all in the name of Marc S. Newkirk et al and entitled "Methods of Making Self-Supporting Ceramic Materials."

The subject matter of this application is also related to that of commonly owned and copending U.S. patent applications Ser. No. 819,397, now allowed, filed Jan. 17, 1986, which is a continuation-in-part of Ser. No. 697,876, now abandoned, filed Feb. 4, 1985, both in the name of Marc S. Newkirk et al and entitled "Composite Ceramic Articles and Methods of Making Same." These applications disclose a novel method for producing self-supporting ceramic composites by growing an oxidation reaction product from a parent metal into a permeable mass of filler, thereby infiltrating the filler with a ceramic matrix.

As disclosed in co-pending U.S. patent application Ser. No. 861,024, now allowed, filed on May 8, 1986, and assigned to the same assignee, a barrier means may be used in conjunction with the filler material or preform to inhibit growth or development of the oxidation reaction product beyond the barrier when vapor-phase oxidants are employed in the formation of the ceramic structure. This barrier facilitates the formation of a ceramic structure with defined boundaries. Suitable barrier means may be any material, compound, element, compositions, or the like which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. These barrier means also may include a suitable combustible or volatile material that is eliminated on heating, or a material which composes on heating, in order to increase the porosity and permeability of the barrier means. Still futher, the barrier means may include a suitable refractory particulate to reduce any possible shrinkage or cracking which otherwise may occur during the process. Such a particulate having substantially the same coefficient of expansions that of the filler bed or preform is especially desirable. For example, if the preform comprises alumina and the resulting ceramic comprises alumina, the barrier may be admixed with alumina particulate, desirably having a mesh size of about 20–1000, but may be still finer. Other, suitable barrier include refractory ceramics or metal sheaths which are open on at least one end to permit a vapor-phase oxidant to permeate the bed and contact the molten parent metal.

The entire disclosure of all of the foregoing Commonly Owned Patent Applications are expressly incorporated herein by reference.

Common to each of these Commonly Owned Patent Applications is the disclosure of embodiments of a ceramic structure comprising an oxidation reaction product and, optionally, one or more non-oxidized constituents of the parent metal precursor or voids or both. The oxidation reaction product may exhibit interconnected porosity which may be a partial or nearly complete replacement of the metal phase. The interconnected porosity will largely depend on such factors as the temperature at which the oxidation reaction product is formed, the length of time at which the oxidation reaction is allowed to proceed, the composition of the parent metal, the presence of dopant materials, etc. Some of the interconnected porosity may be accessible from an external surface or surfaces of the ceramic structure, or is rendered accessible by a post-process operation as by machining, cutting, griding, fracturing, etc.

SUMMARY OF THE INVENTION

The present invention involves recognizing that a condition which is ostensibly undesirable, the attenuation or interruption of the supply of molten metal to the oxidation reaction zone at the interface of freshly formed polycrystalline material and oxidant, may be utilized to form a two-region polycrystalline material provided that an adequate supply of oxidizable parent metal is sustained in the oxidation reaction zone.

Thus, in accordance with one aspect of the present invention there is provided a method for producing a self-supporting ceramic structure comprising a polycrystalline material, e.g., alpha alumina, comprised of a first region and a terminal region integral with the first region but differing therefrom in one or both of composition and microstructure. The method is carried out by the following steps. The parent metal is heated to a temperature range above its melting point but below the melting point of the oxidation reaction product to form a body of molten parent metal. Within that temperature range the body of molten parent metal is reacted with the oxidant to form the oxidation reaction product and, initially, at least a portion of the oxidation reaction product is maintained in contact with and between the body of molten parent metal and the oxidant to progressively transport molten parent metal from the body through the oxidation reaction product and towards the oxidant. In this way, oxidation reaction product continues to form at the interface between the oxidant and previously formed oxidation reaction product thereby forming a progressively thicker first region of oxidation reaction product initially containing interconnected parent metal. The aforesaid transport of molten parent metal from the body is attenuated, or discontinued, and thereafter the reacting is continued within the aforesaid temperature range for a time sufficient to transport the interconnected molten parent metal from said first region toward a surface thereby to form oxidation reaction product on the surface, as the terminal region.

Other aspects of the invention provide for continuing the reacting at least to the point of exhaustion of the body of molten parent metal.

Another aspect of the invention includes forming at least a part of the first region in a first reacting stage. The reacting is then interrupted for an interim stage, in which the first region material may and/or should be separated from the body of parent metal and/or should as desired. After the interim stage, the terminal region is formed in a second reacting stage.

Another aspect of the invention provides for orienting mass of filler and one or both of the parent metal and the resultant polycrystalline material relative to each other so that the polycrystalline material grow towards and into the filler. In this manner, at least part of the filler is embedded by the polycrystalline material so as to provide the ceramic structure as a ceramic composite body.

In accordance with the present invention there is also provided a self-supporting ceramic structure comprising a polycrystalline material, for example, alpha alumina, having a first region and a terminal region which is integral with the first region. The terminal region differs in one or both of composition and microstructure from the first region.

One aspect of the invention provides that the terminal region comprises an outer skin and the first region comprises a substrate surmounted by the terminal region, which may have a finer microstructure than the first region.

Another aspect of the invention provides that at least one of the first and terminal regions embeds a filler, for example, each of the first and terminal regions may embed filler and in such case, optionally, the first region may embed a first filler and the terminal region may embed a second filler which is different from the first filler.

Other aspects of the invention will become apparent from the following Detailed Description of the Invention and the Preferred Embodiments.

As used in this specification and the appended claims, the terms below are defined as follows:

"Ceramic" is not to be unduly construed as being limited to a ceramic structure in the classical sense, that is, in the sense that it consists entirely of non-metallic and inorganic material, but rather refers to a body which is predominantly ceramic with respect to either composition of dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions for ceramic growth.

"Parent metal" is intended to refer to relatively pure metals, commercially available metals with impurities and/or alloying constituents therein, and alloys and intermetallic product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context. For example, when aluminum is the parent metal, the aluminum may be relatively pure metal (e.g. commercially available aluminum of 99.7% purity), or 1100 aluminum having as nominal impurities of about 1% by weight silicon plus iron, or aluminum alloys such as, for example, 5052.

Other aspects of the present invention will be apparent from the following "Detailed Description of the Invention and Preferred Embodiments."

DETAILED DESCRIPTION OF THE INVENTION AND THE PREFERRED EMBODIMENTS

In accordance with the methods of the present invention a self-supporting ceramic structure is produced with a first region and a terminal region which differs from the first region in one or both of composition and crystallite structure. For example, the terminal region may have a higher Rockwell hardness and a finer crystallite microstructure than the first region, even in cases where the composition of both regions is similar or substantially identical. Differences between the first region and the terminal region are clearly discernible upon examining a cross-section of a ceramic structure made in accordance with the present invention. The terminal region shows a distinct band or region standing in contrast to the first region as is readily observable by the unaided eye or under magnification. The terminal region gives the appearance (and may in fact be) of greater density than the first region, which exhibits a larger crystallite grain size than the terminal region, and larger voids or metallic inclusions, or both. The first region has a generally coarser, more open structure than the terminal region, which is comparatively fine-grained and more dense in appearance. In a cross-section of the ceramic structure, the terminal region usually appears as a dense surface band or skin on a core or substrate of the first region.

The conditions under which the terminal region is formed occur when the supply of molten parent metal available to be drawn through the polycrystalline material to form, by oxidation reaction with the oxidant, additional polycrystalline material on the surface of previously formed polycrystalline is attenuated to (or below) a certain level, which may be referred to as a growth-modifying level, or interrupted altogether.

Although not intending to be bound by any particular theory of operation, it is believed that the growth-modifying level is reached in a given zone of the first region when the supply of molten parent metal in that zone is isolated from the body of molten parent metal, either by interruption of the path of travel from the body of molten metal to the zone, or by exhaustion or removal of the body of molten metal. It is speculated that when this occurs, capillary forces transporting the molten parent metal to the interface with the oxidant are reduced, and if further growth of polycrystalline material occurs it takes place under a lower energy condition in which relatively less oxidizable parent metal is available to wet a given area of oxidation reaction product. Accordingly, the oxidation reaction product tends to form as a denser, more finely grained polycrystalline material in which the flow paths for transporting molten parent metal to the interface with the oxidant are of smaller cross-sectional area than in the first region. The reduced cross-sectional area of the flow paths permit transport of the metal there through by the weakened capillary forces.

The fact that the terminal region shows a sharp demarcation from the first region suggests that the growth modifying change or changes in reaction conditions which cause a conversion from forming first region material to forming terminal region polycrystalline material take place rather abruptly. The abrupt nature of such change(s) is consistent with the premise that attenuation of interruption of contiguous transport of the molten parent metal is the growth-modifying change, because such attenuation or interruption would be expedited to take place rather suddenly. For example, exhaustion of the body of molten parent metal is analogous to an automobile running out of fuel; operation is normal or nearly so until the fuel supply disappears or becomes so low that continuous supply to the engine is suddenly interrupted. Sudden interruption of the continuous supply of molten metal can also take place without exhaustion of the body of molten parent metal, by choking off of blocking of the travel path of molten metal from the body thereof to the oxidant interface. This can occur when the body of molten parent metal is depleted, though not exhausted, and a portion at least of it subsides out or contact with the growing polycrystalline material. For example, the subsiding body of molten parent metal may separate from an overlying arch of polycrystalline material which remains in contact with the body only at the peripheral edges thereof. The consequent reduced contact area between the polycrystalline material and the body of parent metal may result in attenuation of flow because of the reduced contact area.

The attenuation or interruption of parent metal transport to the first region may thus come about by exhaustion or depletion of the body of molten parent metal, and in some cases this may be a satisfactory mode of forming the thermal region on ceramic structure. However, there is a preferred mode of operation which provides excellent control of the process by interrupting the oxidation reaction after formation of a desired amount of first region polycrystalline material but before exhaustion or growth-modifying depletion of the body of parent metal. For example, during a first reacting stage of the process, when a first region of desired size has been grown but an ample supply of molten parent metal is still being continuously transported from the body of molten metal to the first region, the furnace temperature may be lowered to below the reacting temperature, e.g., it may be shutoff altogether, and the assembly of parent metal and first region polycrystalline material allowed to cool. The re-solidified parent metal body is then separated from the first region polycrystalline material and the latter is then reheated to the process temperature in the presence of an oxidant. With the first region thus divorced from its precursor parent metal, interconneted parent metal contained therein will react with the oxidant to form the terminal region, as described above. Conducting the process in this staged manner (a first reacting stage, an interim stage and a second reacting stage) avoids the necessity of attempting to precisely calculate how much parent metal must be initially provided to cause attenuation or interruption of the transport of molten metal at a desired stage of growth of the polycrystalline material. Further, this staged manner of operating enables the cutting, grinding, machining or other shaping the first region polycrystalline material to a desired size and shape prior to the second stage reacting to form the terminal region.

A barrier means may be applied to selected portions of the surface of the optionally shaped and sized first region polycrystalline material. As described above, the barrier means will prevent formation of the terminal region in those areas to which it is applied. Therefore, the barrier means, such as a layer of plaster of paris or Portland cement or the like, may be applied in a desired pattern to the first region polycrystalline material to thereby control the pattern of teminal region formed. Alternatively, the thermal region my be formed over substantially the entire surface of the first region polycrystalline material.

The first region material, or a portion thereof, may be separated from the parent metal by cutting, grinding, sawing, fracturing or any other suitable way. The separated first region material may be shaped to any desired shape or geometry before starting the second reacting stage. As used herein and in the claims, "shaping" of the first region polycrystalline material means and includes shaping by any means including, without limitation, cutting, grindng, sawing, chiseling, drilling, machining or polishing, or any combination thereof. Of course, the first region polycrystalline material may be initially grown to a desired geometry by use of one or more of the techniques disclosed in certain Commonly Owned Patent Applications, e.g., the above-mentioned application Ser. No. 861,024 (barrier means), Ser. No. 823,542 (inverse shape replication), or Ser. No. 896,157 (surface shape replication). In such case, the first region polycrystalline material, being grown to a desired, preselected geometry by one or more of the above-mentioned techniques, may not require supplemental shaping. Alternatively, the geometry of such controlled-configuration first region material may be perfected, or modified by one or more shaping operations as described above.

Although the invention is described below with particular reference to aluminum as the parent metal, it should be understood that other parent metals are also applicable, such as silicon, titanium, tin, zirconium, and hafnium.

The features and advantages of the present invention will be more fully apparent from the following non-limiting examples, wherein all parts and percentages are by weight, unless otherwise expressly stated.

EXAMPLE 1

A cylindrical aluminum ingot of 380.1 alloy, an aluminum alloy nominally containing 3.8% copper, 1% iron, less than 0.10% magnesium, 0.41% manganeses, 0.029% nickel, 8.41% silicon and 2.28% zinc, commercially available from Belmont Metals, Inc., 1 inch in diameter and ⅞ inch high was embedded in a bed of alumina (El Alundum, 90 mesh, Norton Co.) such that the top circular surface of the ingot was exposed and substantially flush with the bedding. The alloy was heated at a setpoint temperature of 1100° C. for 48 hours in an atmosphere of air.

The percent weight gain for the ingot upon oxidation reaction as above was 1158%.

Figure 1:
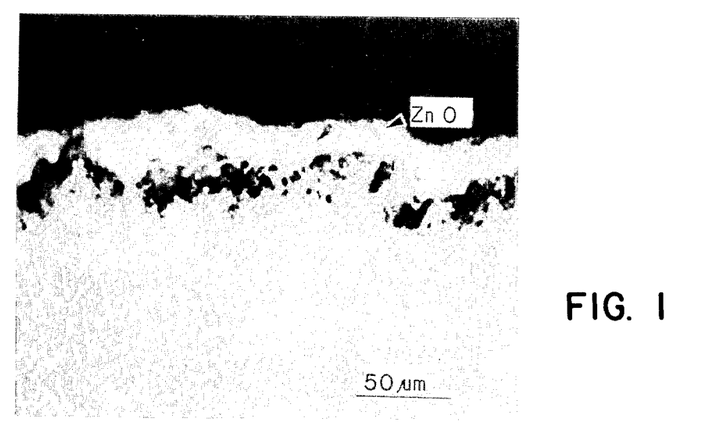
FIG. 1 is a photomicrograph showing the microstructure of a ceramic structure produced in accordance with Example 1 of this application.

Although a polycrystalline material oxidation reaction product (alpha alumina) was formed, sectioning of the resulting product and machine polishing of the cut surface revealed no formation of a terminal region stratum on the first region material. Confirmation of the absence of a stratum or skin was by micrograph (FIG. 1).

EXAMPLE 2

A cylindrical aluminum ingot of aluminum alloy containing 10% silicon and 3% magnesium, 1 inch in diameter and ⅞ inch high was embedded in a bed of alumina (E1 Alundum, 90 mesh) such that the top circular surface of the ingot was exposed and substantially flush with the bedding. The alloy was heated at a setpoint temperature of 1200° C. for 48 hours in an atmosphere of air.

The percent weight gain of the ingot upon oxidation reaction as above was 14%.

Figure 2:
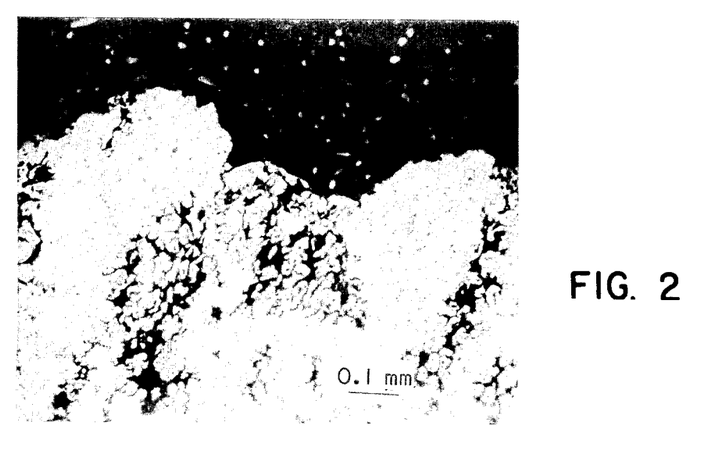
FIG. 2 is a photomicrograph showing the microstructure of a ceramic structure produced in accordance with Example 2 of this application.

Although a polycrystalline material oxidation reaction product (alpha alumina) was formed, sectioning of the resulting product and machine polishing of the cut surface revealed no formation of a terminal region on the first region material. Confirmation of the absence of a dense skin was by photomicrograph (FIG. 2).

EXAMPLE 3

A cylindrical aluminum ingot of commercially available 712 aluminum alloy which was further alloyed with an additional 10% silicon (yielding an aluminum alloy containing nominally 10.3% silicon, 05.% iron, 0.25% copper, 0.1% manganese, 0.6% magnesium, 0.4–0.6% chromium, 5–6.5% zinc, and 0.15–0.25% titanium in a bed of alumina (ElAlundum, 90 mesh) such that the top circular surface of the ingot was exposed and substantially flush with the bedding. The alloy was heated at a setpoint temperature of 1200° C. for 48 hours in an atmosphere of air.

The percent weight gain for the ingot upon oxidation reaction as above was 177%.

Figure 3:
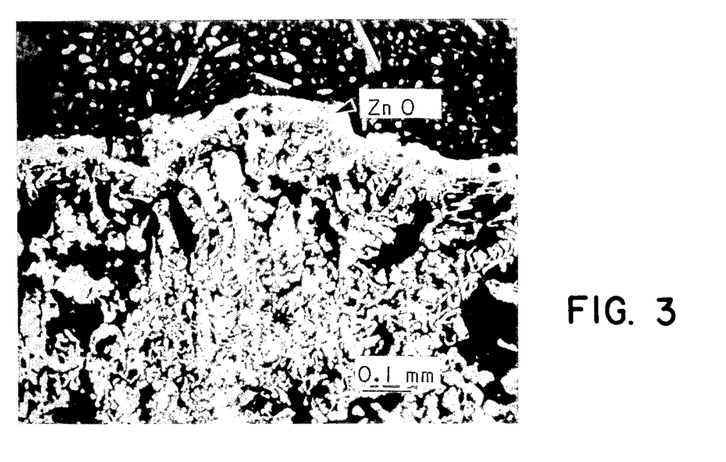
FIG. 3 is a photomicrograph showing the microstructure of the ceramic structure produced in accordance with Example 3 of this application.

Although a polycrystalline oxidation reaction product (alpha alumina) was formed, sectioning of the resulting product and machine polishing of the cut surface revealed no formation of a thermal region material stratum or layer. Confirmation of the absence of a thermal region on the first region material was by photomicrograph (FIG. 3).

EXMAPLE 4

A cylindrical aluminum ingot of commercially available 712 aluminum alloy (the same alloy as in Example 3) except with a silicon content of 0.3%) 1 inch in diameter and ⅞ inch high was embedded in a bed of alumina (El Alundum, 90 mesh) such that the top circular surface of the ingot was exposed and substantially flush with the bedding. The alloy was heated at a setpoint temperature of 1200° C. for 48 hours in an atmosphere of air.

The percent weight gain for the ingot upon oxidation reaction as above was 80%.

Figure 4:
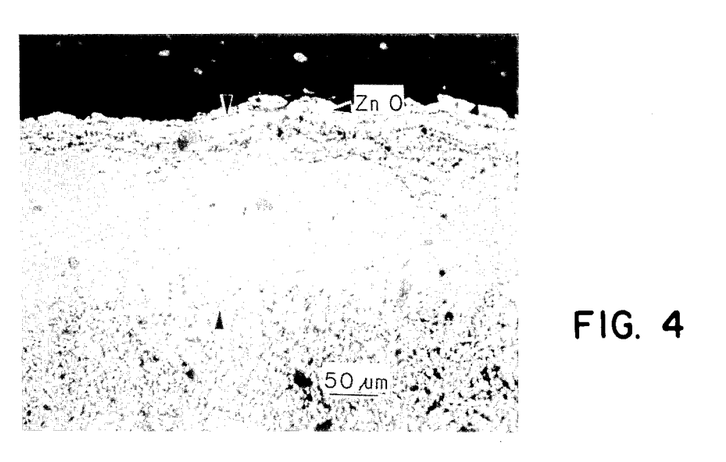
FIG. 4 is a photomicrograph showing the microstructure of a ceramic structure produced in accordance with Example 4 of this application.

Sectioning of the resulting product and machine polishing of the cut surface revealed the formation of a dense terminal region layer on the first region material. Confirmation of the formation was by photomicrograph (FIG. 4).

EXAMPLE 5

A cylindrical aluminum ingot of commercially available 5052 alloy (an aluminum alloy containing 0.1% copper, 0.4% iron, 2.2–2.8% magnesium, 0.1% manganese, 0.25% silicon, 0.1% zinc, and 0.15–0.35% chromium), 1 inch in diameter and ⅞ inch high was embedded in a bed of alumina (E1 Alundum, 90 mesh) such that the top circular surface of the ingot was exposed and substantially flush with the bedding. The alloy was heated at a setpoint temperature of 1200° C. for 48 hours in an atmosphere of air.

The percent weight gain for the ingot upon oxidation reaction as above was 44%.

Figure 5:
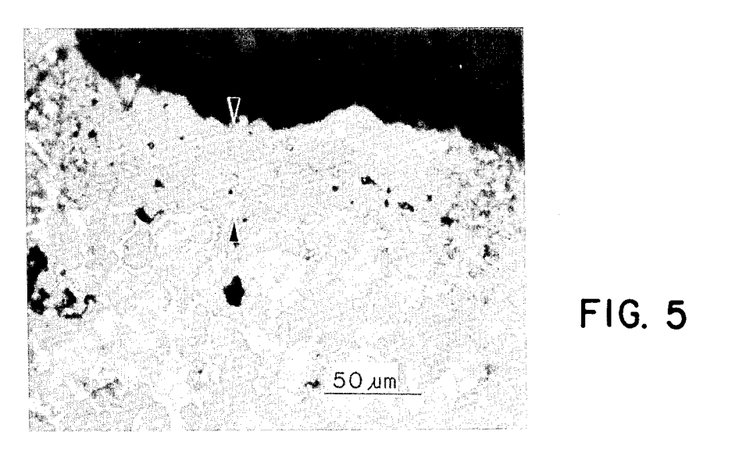
FIG. 5 is a photomicrograph showing the microstructure of a ceramic structure produced in accordance with Example 5 of this application.

Sectioning of the resulting product and machine polishing of the cut surface revealed formation of a dense terminal region layer. Confirmation of the formation was by photomicrograph (FIG. 5).

EXAMPLE 6

A cylindrical aluminum ingot of commercially available 6061 alloy (an aluminum alloy containing 0.15% copper. 0.7% iron, 0.8–1% magnesium, 0.15% manganese, 0.4–0.6% silicon, 0.15% zinc, and 0.15–35% chromium), 1 inch in diameter and ⅜ inch high was embedded in a bed of alumina (El Alundum, 90 mesh) such that the top circular surface of the ingot was exposed and substantially flush with the bedding. The alloy was heated at a setpoint temperature of 1200° C. for 48 hours in an atmosphere of air.

The percent weight gain for the ingot upon oxidation reaction as above was 23%.

Figure 6:
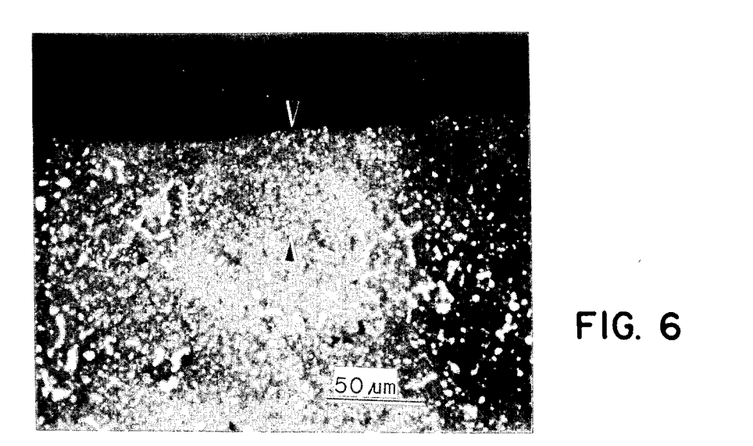
FIG. 6 is a photomicrograph showing the microstructure of a ceramic structure produced in accordance with Example 6 of this application.
Figure 7:
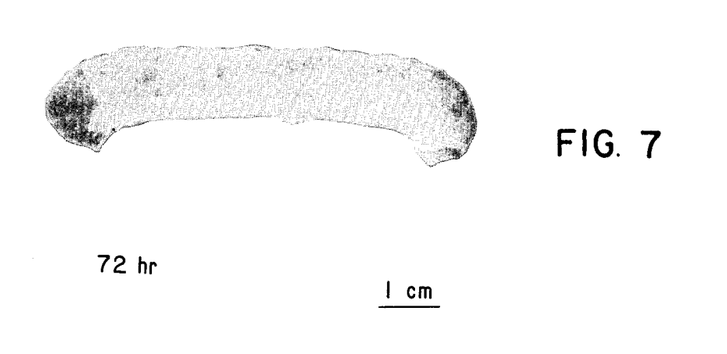
FIGS. 7–13 are photomicrographs showing the microstructure of a ceramic structure produced in accordance with Example 7, showing the various phases of growth of the dense skin layer.
Figure 8:
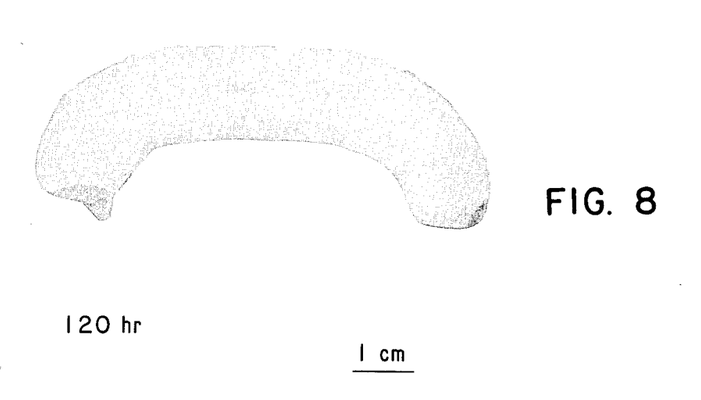
Figure 9:
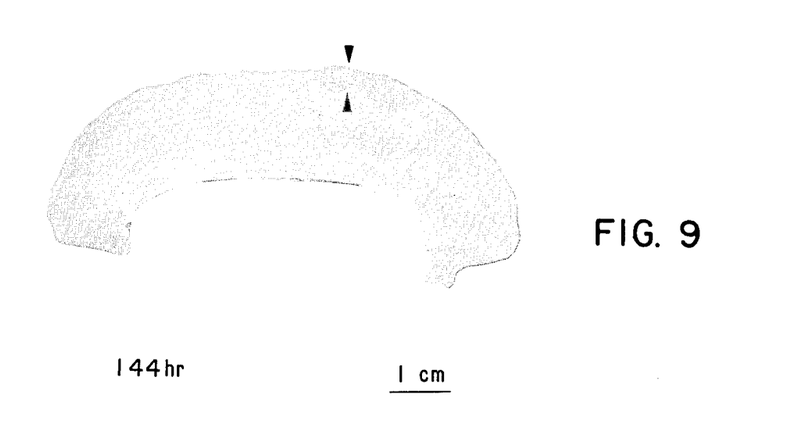
Figure 10:
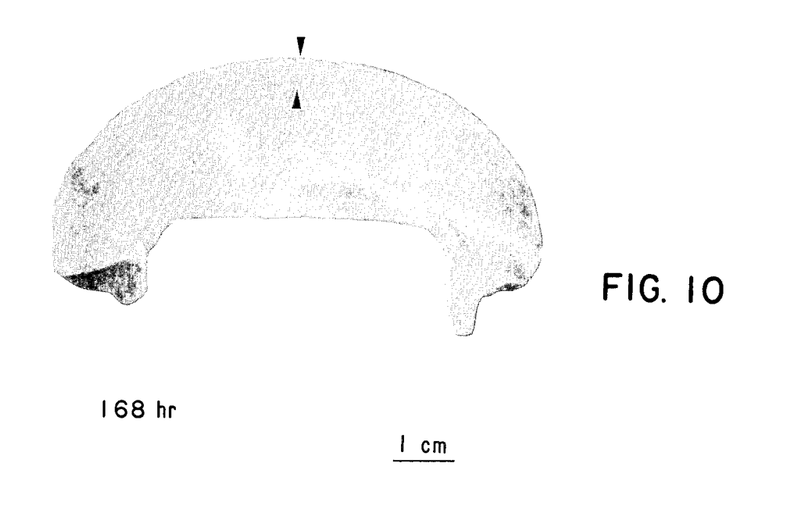
Figure 11:
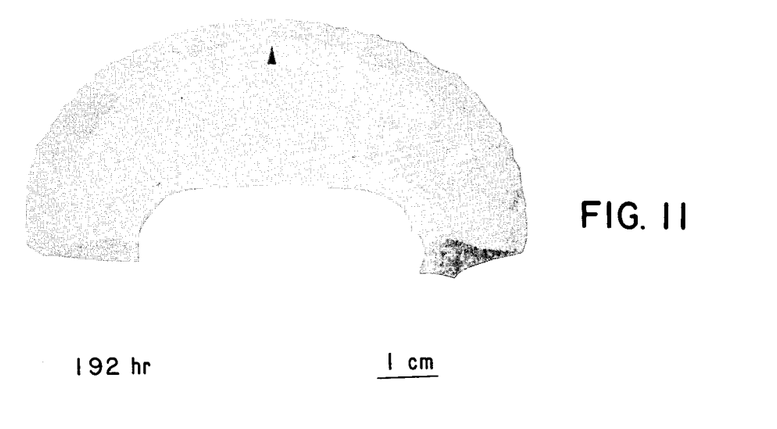
Figure 12:
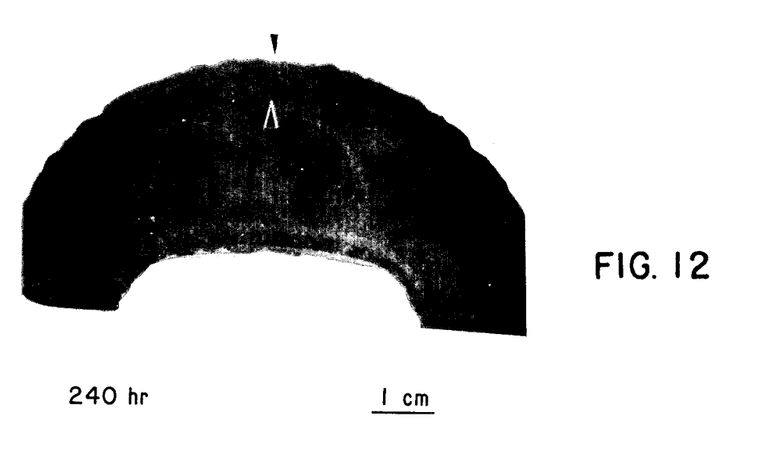
Figure 13:
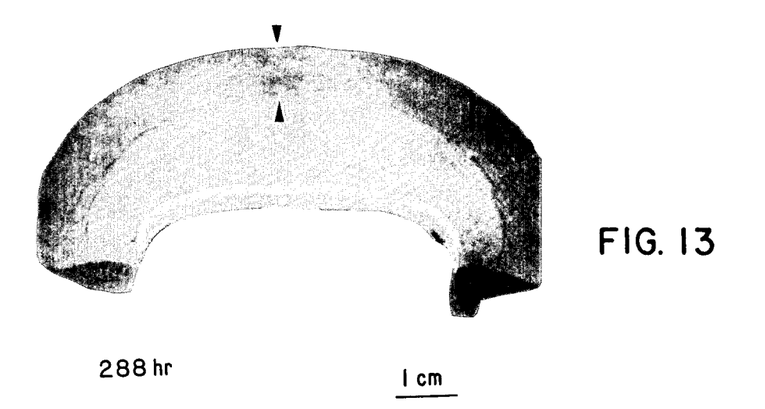

Sectioning of the resulting product and machine polishing of the cut surface revealed formation of a dense, terminal region layer on the first region substrate. Confirmation of the formation was by photomicrograph (FIG. 6).

EXAMPLE 7

To determine the effect of time on the formation of a terminal region layer, seven 9 inch long by 2 inch wide by ½ inch thick bars (Samples 1–7) of commercially available 5052 alloy aluminum were embedded in separate beds of alumina (El Alundum, 90 mesh) such that the 9×2 inch face of the bar was exposed and substantially flush with the bedding. the seven bars each were externally doped by sprinkling 1 g. of silicon dioxide uniformly over its exposed surface. The respective bars were heated separately at a reaction setpoint temperature of 1225° C. in an atmosphere of air for varying times.

The reaction product from each of examples 1–7 was sectioned and the cut surfaces were machine polished and are pictured in FIGS. 7–13, resepectively. The samples we examined and where terminal layers were present, they were measured. The results of the examination and measurment are tabulated in Table 7 in which the terminal layers are referred to simply as "dense layers".

TABLE 7

| Sample | Time, Hrs. | Observed | Thickness measured of Densified Surface Layer |
| --- | --- | --- | --- |
| 1 | 72 | No dense layer | — |
| 2 | 120 | No dense layer | — |
| 3 | 144 | Dense layer | .33 cm |
| 4 | 168 | Dense layer | .42 cm |
| 5 | 192 | Dense layer | .33 cm |
| 6 | 240 | Dense layer | .66 cm |
| 7 | 288 | Dense layer | .83 cm |

The measured values of the densified terminal region surface layer shown in the above Table 7 were obtained by physical measurement of the photomicrographs of FIGS. 9–13 as the distance between the tips of the opposing arrows designating the dense surface layer in these photomicrographs. This is believed to result from the oxidation resistance of silicon udner the reaction conditions utilized coupled with the increase in concentration of the silicon in the molten parent metal as the supply of molten parent metal is attenuated in the first region of the polycrystalline material. The concentration of silicon, which was not oxidized to any noticeable degree under the conditions utilized, apparently became great enough to render the molten parent metal residue refractory to the oxidation reaction before the energy conditions (as described above) became low enough to cause formation of an identifiable terminal region. Although applicants do not intend to be bound by the foregoing theory, it appears to satisfactorily answer the results obtained. Thus, in order to obtain the terminal region, the diminished supply of molten parent metal, although sufficiently diminished to engender the reduced energy conditions for forming the terminal region, must nonetheless contain sufficient oxidizable molten parent metal to react with the oxidant to form the polycrystalline material of the terminal region. Accordingly, the use in or in conjunction with the parent metal of significant amounts of parent metal components which are non-oxidizable under the reacting conditions used, may serve to preclude formation of the terminal region even if conditions otherwise conductive to such formation, e.g., diminishment of the supply of molten parent metal to the first region, obtain.

EXAMPLE 8

Figure 14:
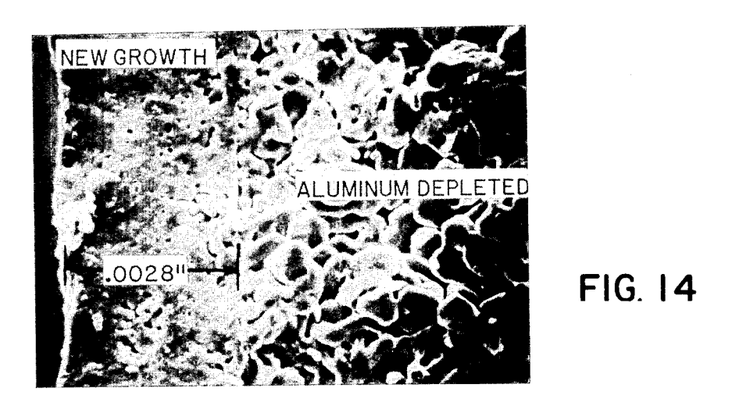
FIG. 14 is a photomicrograph showing the microstructure of a ceramic body produced in accordance with Example 8.

An experiment was conducted in order to determine if, after growing a terminal region at a location remote from the body of molten parent metal, a section of the first region adjacent to the body of parent metal could be used to grow its own terminal region. Two bars of commercially available 5052 aluminum alloy each measuring 2 inches by 9 inches by ½ inch thick had 0.3 grams of SiO₂ applied thereto, in a center section of a 2 inch by 9 inch face of each bar. The SiO₂ was applied in a rectangular area of about 4.5 square inches centered on the bar and spaced from its edges. The SiO₂-doped surfaces of the bars were left exposed as the bar were emplaced in a bed of 90 grit El Alundum (supplied by Norton Company). The resulting lay-up was heated in air in a first reacting stage at 1175° C. for 120 hours and resulted in thick, loaf-like polycrystalline material body having a substrate first region material and a thick skin or structure of terminal region material. Upon examination of the material after cooling to ambient temperature, a copious quantity of aluminum parent metal was seen to remain after the run, at the side of the first region remote from the terminal region. A rectangular section of first region polycrystalline material was cut from a portion thereof adjacent the body of aluminum parent metal, ground to provide it with flat surfaces, and stood on end in an alumina boat. In a second reacting stage, this sample was placed in a tube furnace for 24 hours at 1175° C. in flowing air. After removal from the furnace and cooling, a sample was cut from an edge of the material which was not in contact with the alumina boat, fractured and photographed. The formation of the terminal region is shown in FIG. 14 in which the terminal region is labelled "NEW GROWTH" and the first region is labelled "ALUMINUM DEPLETED". FIG. 14 is a photomicrograph at 1000X magnification and the dimension line shows that the terminal region stratum is nearly three mils (0.0028 inch) in thickness. The terminal stratum is clearly shown to have a dense, exceedingly fine microstructure as compared to the first region substrate, which is substantially depleted of aluminum parent metal metallic inclusion.

Example 8 demonstrates that one zone of the first region can have its supply of parent metal sufficiently attenuated to form a terminal region while another zone of the first region, sufficient close to the body of molten metal, may be used (after separation from the body of molten metal) to form its own, i.e., another, terminal region. Example 8 also demonstrates a staged reaction in which first zone polycrystalline material is formed in a first reaction stage and the reacting is interrupted in an interim stage in which the first region material, more precisley, a selected part of the first region material, is separated from the parent metal body, after cooling of the ceramic structure to ambient temperature. The cut section was shaped by grinding its surfaces flat, in the interim stage. Thereafter, in a second reacting stage, the terminal region was ground on the separated and shaped section of first region material. The fact that a terminal region was grown in the first reacting stage at a location remote from the first region material from which the shaped sample was cut for the second reacting stage simply reflects the conditions obtaining in this particular run. It is neither essential nor inevitable that terminal region material will form the first reacting stage.

As explained above, the ceramic body is produced from a suitable parent metal according to the processes disclosed in the Commonly Owned Patent Applications. In one preferred embodiment, a composite is produced by utilizing a mass of filler material placed adjacent to and in contact with a surface of the parent metal, and the process is continued until the oxidation reaction has infiltrated the bed of filler material to its boundary which can be defined by a suitable barrier means. The mass of filler, which preferably is shaped as a preform, is sufficiently porous or permeable to allow the oxidant, in the case of a gas-phase oxidant, to permeate the filler and contact the metal, and to accommodate growth of the oxidation reaction product within the filler. Alternatively, the oxidant may be contained within or comprise the filler. The filler may include any suitable material such as particulates, powder, platelets, hollow bodies, spheres, fibers, whiskers, etc., which typically are ceramic materials. A metallic filler material may be used such as metal particles or fibers, if protected by a coating from interdiffusion with the foreign metal, or if it is desired to also modify the properties of the filler by interdiffusion with the foregoing metal. Further, the bed of filler may include a lattice of reinforcing rods, plates, or wires. Typically in these polycrystalline ceramic structures, including ceramic composites, the oxidation reaction product crystallites are interconnected and the metal-containing component is at least partially interconnected and accessible from an external surface of the ceramic body.

As explained in the Commonly Owned Patent Applications, dopant materials used in conjunction with the parent metal can, in certain cases, favorably influence the oxidation reaction process, particularly in systems employing aluminum as the parent metal. The function or functions of a dopant material can depend upon a number of factors other than the dopant material itself. Such factors include, for example, the particular combination of dopants when two or more dopants are used, the use of an externally applied dopant in combination with a dopant alloyed with the parent metal, the concentration of the dopant(s), the oxidizing environment, and the process conditions.

The dopant or dopants used in conjunction with the parent metal (1) may be provided as alloying constituents of the aluminum parent metal, (2) may be applied to at least a portion of the surface of the parent metal, or (3) may be applied to or incorporate into part or all of the filler material or preform, or any combination of two or more of techniques (1), (2) and (3) may be employed. For example, an alloyed dopant may be used solely or in combination with a second externally applied dopant. In the case of technique (3), where additional dopant or dopants are applied to the filler material, the application may be accomplished in any suitable manner as explained in the Commonly Owned Patent Applications.

Dopants useful for an aluminum parent metal, particularly with air as the oxidant, include magnesium, zinc, and silicon either alone or in combination with each other or in combination with other dopants, as described below. These metals, or a suitable source of the metals, may be alloyed into the aluminum-based parent metal at concentrations for each of between about 0.1-10% by weight based on the total weight of the resulting doped metal. Thes dopant materials or a suitable source thereof (e.g. MgO, ZnO, or $SiO_2$) may also be used externally to the parent metal. Thus, an alumina ceramic structure is achievable for an aluminum silicon alloy as the parent metal using air as the oxidant by using MgO as a surface dopant in an amount greater than about 0.0008 gram per gram of parent metal to be oxidized and greater than 0.003 gram per square centimeter of parent metal upon which the MgO is applied.

Additional examples of dopant materials effective with aluminum parent metals oxidized with air include sodium, germanium, tin, lead, lithium, calcium, boron, phosphorus, and yttrium which may be used individually or in combination with one or more other dopants depending on the oxidant and process conditions. Rare earth elements such as cerium, lanthanum, praseodymium, neodymium, and samarium are also useful dopants, and herein again especially when used in combination with other dopants. All of the dopant materials as explained in the Commonly Owned Patent Applications are effective in promoting polycrystalline oxidation reaction product growth for the aluminum-based parent metal systems.

A solid, liquid or vapor-phase (gas) oxidant, or a combination of such oxidants, may be employed, as noted above. For example, typical oxidants include, without limitation, oxygen, nitrogen, a halogen, sulphur, phospohorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two i.e., $H_2/H_2O$ and $CO/CO_2$) being useful in reducing the oxygen activity of the environment.

Although any suitable oxidants may be employed, specific embodiments of the invention are described below with reference to use of vapor-phase oxidants. If gas or vapor oxidant, e.g., air, as the vapor-phase oxidant, is used in conjunction with a filler, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air, therefore, falls within the definition of an "oxygen-containing gas" oxidant but not within the definition of a "nitrogen-containing gas" oxidant. An example of a "nitrogen-containing gas" oxidant as used herein and in the claims is "forming gas", which contains about 96 volume percent nitrogen and about 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler, or a portion thereof adjacent the molten metal, is impregnated with the oxidant. The filler, for example, may be coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Example of liquid oxidants as herein defined include low melting glasses.

What is claimed is:

1. A method for producing a self-supporting ceramic structure comprising a polycrystalline material comprised of a first region and a terminal region integral with said first region but differing therefrom in at least one property selected from the group consisting of composition and microstructure, the method comprising the steps of:
   (a) heating a parent metal to a temperature range above its melting point but below the melting point of the oxidation reaction product to form a body of molten parent metal; and
   (b) within said temperature range,
      (i) reacting said body of molten parent metal with an oxidant to form said oxidation reaction product,
      (ii) initially maintaining at least a portion of said oxidation reaction product in contact with and between said body of molten parent metal and said oxidant to progressively transport molten parent metal from said body of molten parent metal through the oxidation reaction product and towards the oxidant, so that oxidation reaction product continues to form at the interface between the oxidant and previously formed oxidation reaction product, thereby forming a progressively thicker first region of oxidation reaction product initially containing interconnected parent metal;
   (c) attenuating said transport of molten parent metal from said body of molten parent metal, and
   (d) after step (c) resuming a reaction between at least a portion of said interconnected parent metal from said first region of oxidation reaction product toward a surface of said first region to form oxidation reaction product on said surface and continuing said resumed reaction for a time sufficient to form a terminal region of oxidation reaction product.

2. The method of claim 1, including continuing said resumed reaction at least to a point of exhaustion of said body of molten parent metal.

3. The method of claim 1, including orienting a mass of filler material and at least one growth material selected from the group consisting of said parent metal and said first region of oxidation reaction product relative to each other so that said at least one growth material grows towards and into said mass of filler material, whereby at least a portion of said mass of filler material is embedded by said at least one growth material to provide said ceramic structure as a ceramic composite body.

4. The method of any one of claims 1, 2 or 3, including forming of at least a portion of said first region in a first reacting stage, followed by interrupting said first reacting stage in an interim stage and, after said interim stage, forming said terminal region in a second reaction stage.

5. The method of claim 4, wherein said interim stage includes allowing said first region of oxidation reaction product to cool to ambient temperature.

6. The method of claim 4, including terminating said first reacting stage prior to exhaustion of said body of parent metal and, in said interim stage, separating at least a portion of said first region of oxidation reaction prodcut from said body of parent metal, and therafter carrying out said second reacting stage on said at least a portion of said first region out of contact with said body of parent metal.

7. The method of claim 6, including shaping the separated first region prior to carrying out said second reacting stage.

8. The method of claim 1, including forming at least a portion of said first region of oxidation reaction product in a first reacting stage and thereafter orienting a mass of filler material and said first region relative to each other so that upon forming said terminal region grows towards and into said filler material, whereby at least a portion of said filler material is embedded by said terminal region and said ceramic structure comprises a ceramic composite structure.

9. The method of claim 1, including providing said ceramic structure as a ceramic composite structure by (1) orienting said parent metal and a mass of first filler material relative to each other and, in a first reacting stage, forming said first region of oxidation reaction product towards and into said first filler material to embed at least a portion of said first filler material therein, and (2) thereafter orienting the first region of oxidation reaction product and a mass of second filler material relative to each other and, during formation of said terminal region, growing said terminal region into said second filler material to embed at least a portion of said second filler material therein.

10. The method of claim 9, wherein said first filler material comprises a material which is different from said second filler material.

11. The method of any one of claims 1, 2, 3, 6, 7, 8, 9 or 10, wherein said oxidant is a vapor-phase oxidant.

12. The method of claim 11, wherein said vapor-phase oxidant comprises an oxygen containing gas, said parent metal comprises an aluminum parent, metal, said polycrystalline material is comprised of alpha-alumina, and including using at least one suitable dopant in conjunction with said parent metal.

13. The method of claim 12, wherein said oxidant comprises air and said temperature range is from about 850° C. to about 1450° C.

14. The method of any one of claims 1, 2, 3, 6, 7, 8, 9 or 10, including using at least one suitable dopant material in conjunction with said parent metal.

15. The method of claim 14, wherein said parent metal comprises an aluminum parent metal.

16. The method of any one of claims 1, 2, 3, 6, 7, 8, 9 or 10, wherein said terminal region has a finer microstructure than said first region.

17. The method of anyone of claim 1, 2, 3, 6, 7, 8, 9 or 10, including interposing a barrier means in at least a portion of the path of formation of at least one of said first region and said terminal region to thereby limit and define the extent of such formation.

18. The method of claim 17, including orienting said barrier means and said parent metal relative to each other so that growth of said terminal region is prevented in the vicinity of said barrier means but occurs in at least one other direction in which the path of formation of said first region is not blocked by said barrier means.

19. The method of any one of claims 1, 2, 3, 6, 7, 8, 9 or 10, including forming said first region of polycrystalline material to a preselected geometry and thereafter forming said terminal region on said first region.

20. The method of claim 4, including using at least one suitable dopant material in conjunction with said parent metal.

21. The method of claim 20, wherein said parent metal comprises an aluminum parent metal.

* * * * *

UNITED STATES PATENT AND TRADEMARK OFFICE
CERTIFICATE OF CORRECTION

PATENT NO. : 4,837,232

DATED : June 6, 1989

INVENTOR(S) : Stanley J. Luszcz et al.

It is certified that error appears in the above-identified patent and that said Letters Patent is hereby corrected as shown below:

On the cover page of Patent, Item No. [56] change "3,3437,468" to --3,437,468--.

Column 1, line 9: change "plycrystalline" to --polycrystalline--;
Column 1, line 17: change "713,360" to --4,713,360--;
Column 1, line 32: change "strucutre" to --structure--.
Column 2, line 21: change "expansions" to --expansion as--;
Column 2, line 26: after "Other" delete the comma;
Column 2, line 27: change "barrier" to --barriers--.
Column 3, line 31: delete "and/or should";
Column 3, line 37: change "grow" to --grows--.
Column 4, line 1: change "material" to --materials--;
Column 4, line 3: change "of" to --or--;
Column 4, line 62: change "photomicrographs" to --photographs--; delete "mi-";
Column 4, line 63: change "crostructure" to --structure--.
Column 5, line 6: after "tion" insert a comma;
Column 5, line 35: after "polycrystalline" insert --material--.
Column 6, line 10: change "of" to --or--;
Column 6, line 14: change "or" to --of--;
Column 6, line 26: After "on" insert --a--;
Column 6, line 39: change "shutoff" to --shut off--;
Column 6, line 46: change "interconneted" to --interconnected--;
Column 6, line 68: change "my" to --may--.
Column 7, line 11: change "grindng" to --grinding--;
Column 7, line 41: change "manganeses" to --manganese--;
Column 7, line 51: change "1158%" to --158%--.

UNITED STATES PATENT AND TRADEMARK OFFICE
CERTIFICATE OF CORRECTION

PATENT NO. : 4,837,232

DATED : June 6, 1989

INVENTOR(S) : Stanley J. Luszcz et al.

It is certified that error appears in the above-identified patent and that said Letters Patent is hereby corrected as shown below:

Column 8, line 2: change "14%" to --141%--;
Column 8, line 15: change "05.%" to --0.5%--;
Column 8, line 28: change "thermal" to --terminal--;
Column 8, line 29: delete "ther-";
Column 8, line 30: change "mal" to --terminal--;
Column 8, line 33: change "EXMAPLE 4" to --EXAMPLE 4--;
Column 8, line 36: change "3)except" to --3, except--;
Column 8, line 37: change "1/8" to --7/8--.
Column 9, line 32: change "1225°C" to --1125°C--;
Column 9, line 37: change "we" to --were--;
Column 9, line 56: change "photomicrographs" to --photographs--;
Column 9, line 59: change "photomicrographs" to --photographs--;
Column 9, line 60: change "udner" to --under--.
Column 10, line 16: change "conductive" to --conducive--;
Column 10, line 18: change "obtain" to --are in existence--;
Column 10, line 33: change "bar" to --bars--;
Column 10, line 36: after "in" insert --a--;
Column 10, line 62: change "inclusion" to --inclusions--;
Column 10, line 66: change "sufficient" to --sufficiently--.
Column 11, line 66: change "incorporate" to --incorporated--.
Column 12, line 16: change "Thes" to --These--;
Column 12, line 43: change "phospohorus: to --phosphorus--;
Column 12, line 48: change "i.e.," to --(i.e.,--;
Column 12, line 53: after "If" insert --a--.
Column 13, line 32: after "avoided" insert --by--;
Column 13, line 51: change "Example" to --Examples--;
Column 14, line 50: change "prodcut" to --product--; change "therafter" to --thereafter--;
Column 14, line 61: after "region" insert --in step (d), said terminal region--.
Column 15, line 18: change "parent, metal," to --parent metal,--.

UNITED STATES PATENT AND TRADEMARK OFFICE
CERTIFICATE OF CORRECTION

PATENT NO. : 4,837,232

DATED : June 6, 1989

INVENTOR(S) : Stanley J. Luszcz et al.

It is certified that error appears in the above-identified patent and that said Letters Patent is hereby corrected as shown below:

Column 7, line 51: change "1158%" to --158%--.

Column 16, line 6: change "anyone" to --any one--; change "claim" to --claims--.

Signed and Sealed this

Eighteenth Day of September, 1990

Attest:

HARRY F. MANBECK, JR.

*Attesting Officer*     *Commissioner of Patents and Trademarks*